July 28, 1953 R. B. TROUSDALE 2,647,206

ELECTRONIC SWITCHING DEVICE

Filed Jan. 27, 1950 3 Sheets-Sheet 1

INVENTOR.
Robert B. Trousdale
BY
T. L. Bowes
Att'y

INVENTOR.
Robert B. Trousdale
BY
J. L. Bowes
Att'y

INVENTOR.
Robert B. Trousdale
BY
T. L. Bowes
Att'y

Patented July 28, 1953 2,647,206

UNITED STATES PATENT OFFICE 2,647,206

ELECTRONIC SWITCHING DEVICE

Robert B. Trousdale, Rochester, N. Y., assignor to Stromberg-Carlson Company, a corporation of New York Application January 27, 1950, Serial No. 140,929

27 Claims. (Cl. 250—27)

This invention relates to an electronic switching device and more particularly to an electronic switching device for controlling an electric circuit including an improved time delay feature for preventing inadvertent or unintentional switching from taking place. Specifically the instant application is a continuation in part of copending Trousdale application Serial No. 70,252, filed January 11, 1949, now abandoned.

In many situations it is desirable to provide an electronic switching arrangement in which power is automatically applied or removed in a controlled manner. This is particularly true where numerous electron discharge valves are employed as in radio receivers, sound amplifiers, and communication circuits utilizing electron discharge devices, since it is desirable to avoid unnecessary current drain during idle periods of the equipment by switching off the anode potentials. A specific application of the present invention is in the telephone system art where it is desirable to provide a control arrangement for switching control potentials in response to the removal of the receiver from its hook by the calling party. In an electronic system where relays are replaced by electron discharge devices, it is furthermore desirable that these control potentials be removed when the receiver is replaced on the hook to avoid unnecessary current drain. On the other hand, it is essential that these control potentials remain in effect for a predetermined period after the receiver is replaced on the hook in order that hook switch flashing and the like do not cause the circuit which is being prepared between the called and calling party to be interrupted. In other words, in telephone systems, for example, it is essential to avoid premature release of the link due to delays in dialing or for any other reasons. A specific application of the present invention to a telephone system is disclosed in a copending joint application of Frank A. Morris and Robert B. Trousdale, Serial No. 134,974, filed December 24, 1949, and assigned to the same assignee as the present application.

It is an object of the present invention to provide a new and improved electronic switching circuit for applying and removing potentials in response to a predetermined control.

It is another object of the present invention to provide an electronic switching arrangement including an improved time delay feature for preventing premature removal of the control potentials.

Still another object of the present invention is to provide an electronic switching device in which the application or removal of signal pulses renders the switching device effective or ineffective to control suitable potentials and wherein a predetermined time delay in the switching operation is provided to prevent removal of the control potentials due to momentary lapses in the supply of pulse signals.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which.

The switching device of the present invention contemplates the employment of a plurality of electronic discharge devices connected in a control circuit and operative in response to the supply of a pulse signal current to remove from or apply to an associated circuit suitable control potentials. By way of example, the switching circuit may be caused to operate and apply the control potentials to an associated circuit such for example as a load circuit, in response to the receipt of periodic positive current pulses. Upon the cessation of the receipt of such current pulses, means are provided to cause the switching device to remove the potentials applied to the associated apparatus but not until the elapse of a predetermined time delay, thereby to prevent premature removal of the potentials applied to the associated circuit.

While the electronic switching circuit of the present invention is particularly well adapted for use in connection with an electronic telephone system for rendering effective and ineffective connectors for connecting the called and calling circuits to provide a signal link and to prevent premature release of such link due to various factors, it will be understood that the electronic switching device of the present invention has numerous other applications and may be employed whenever the application or removal of switching potentials in response to the receipt or absence of pulse signals is desired.

Figure 1:
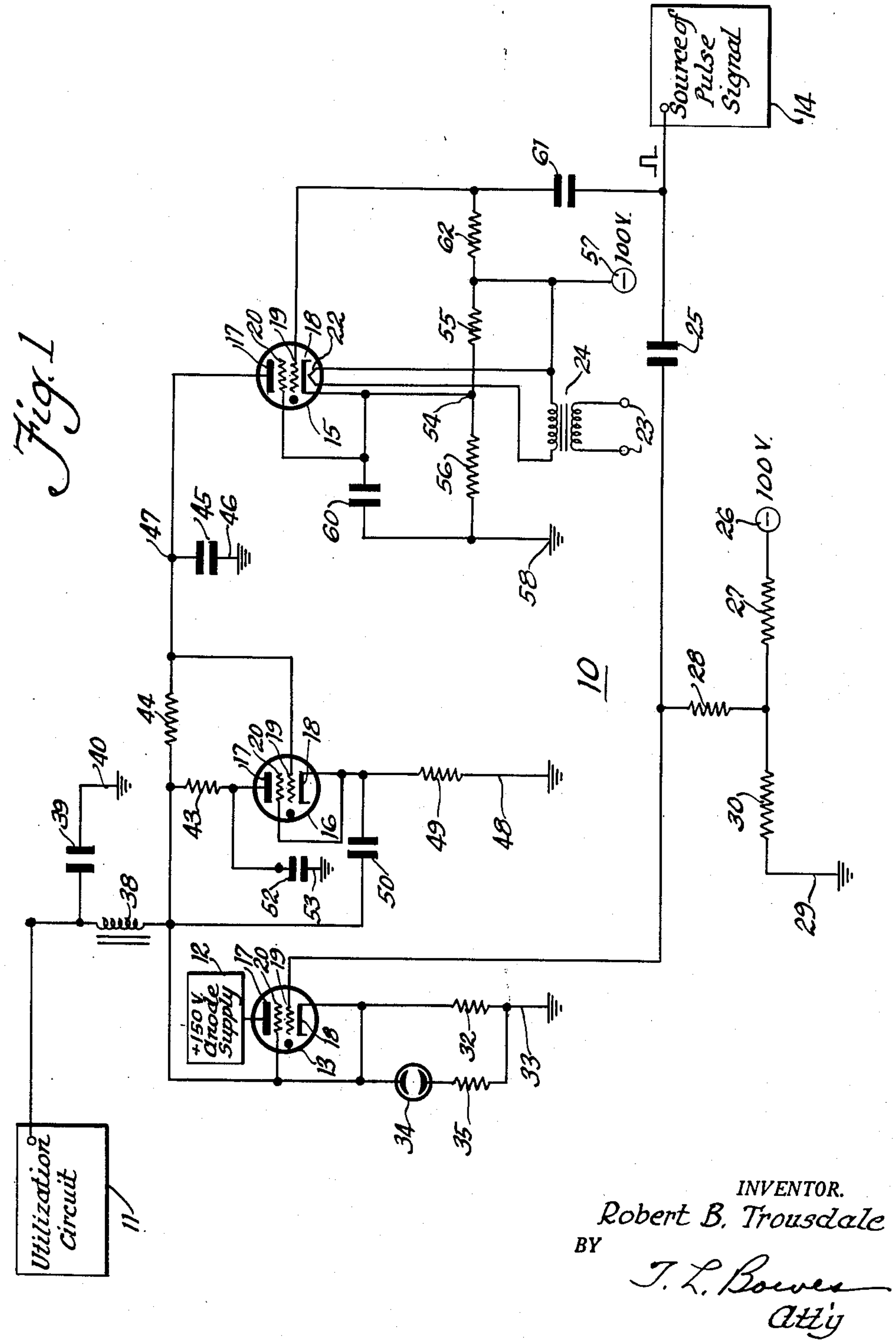
Fig. 1 is a schematic diagram illustrating one embodiment of the present invention.

Considering now the embodiment of Fig. 1 of the drawings which at present is considered to be the preferred embodiment, there is illustrated an electronic switching circuit generally designated at 10 for controlling the potentials applied to an associated utilization circuit generally designated at 11, from a +B source of potential 12, which generally is a source of anode potential, through an electronic switch 13 serially connected between the source 12 and the output 11. As illustrated the source 12 provides the anode supply for the utilization circuit 11 when the electronic switch is operative to conduct current therebetween. The electronic switch preferably comprises an electron discharge valve containing an ionizable medium generally referred to as a gas tube or thyratron designated as 13 whereby when rendered conductive it has a relatively low and constant voltage drop. In the preferred embodiment, shown by the drawings, the control of the potentials supplied to the utilization circuit 11 is accomplished in response to the absence or presence of pulse signals supplied to the electronic switching circuit 10 from a suitable pulse input circuit generally designated at 14. The pulse input circuit is capable of supplying pulse signals of the type shown in Fig. 2 of the drawings, which pulse signals may be discontinued or initiated in response to suitable control means for the pulse input circuit which forms no part of the present invention. For a particular application in which the present switching circuit has been found to be especially effective, the switched potentials supplied to the output or utilization circuit 11 in response to the pulse signals of Fig. 2 may take the form shown in Fig. 3 of the drawings although from the detailed description included hereinafter it will be understood that the output of switched potentials may be controlled in various manners.

In accordance with the present invention, the electronic switching circuit 10 in addition to the electron discharge valve 13 further comprises electron discharge valves 15 and 16. The electron discharge valve 15 comprises a timing tube, and the electron discharge valve 16, as will become apparent from the following description, functions as an extinguishing tube for interrupting the space discharge current through the electron discharge valve 13. Preferably and for a specific application for which the electronic switching circuit 10 has been found to be especially effective, the electron discharge valves 13, 15 and 16 are highly sensitive thyratrons such as, for example, the RCA commercial type 5696, each comprising an anode 17, a cathode 18, a control electrode 19 and a screen grid 20. For reasons which will become apparent as the following description proceeds, the electron discharge valve 15 is provided with a filament 22 connected to a separate heater supply source generally designated at 23 through a suitable filament transformer 24.

In order to cause operation of the switch tube 13 in response to pulse signals supplied thereto from the pulse input circuit 14, the control electrode 19 of the electron discharge valve or switch tube 13 is connected to the pulse input circuit 14 through a suitable coupling capacitor 25. A suitable negative bias potential is also supplied to the control electrode 19 of valve 13 from a terminal 26 connected to a source of negative potential through a voltage dropping resistor 27 and a current limiting resistor 28. The terminal of the voltage dropping resistor 27 remote from the terminal 26 is connected to ground generally designated at 29 through a suitable resistor 30. The plate or anode of the electron discharge valve 13 is, of course, directly connected to the anode potential source 12. The plate circuit of the switching tube 13 further includes a cathode resistor 32 connected between the cathode 18 and the ground terminal 33. When the electron discharge valve 13 fires to produce space current flow therethrough, the potential of the source 12, except for the voltage drop across the tube 13, which is relatively low, appears across the cathode load resistor 32. For the indicated source of potential 12, the voltage across the cathode load resistor will be approximately 140 volts. Preferably a suitable neon indicator 34 serially arranged with a resistor 35 is connected across the cathode load resistor 32 for the purpose of providing a visual indication of the condition of the switch tube 13. When the visual indicator is energized it provides an indication that the switch tube 13 is passing space current and applying control potentials to the associated load circuit 11.

The screen grid 20 of the electron discharge valve or switch tube 13 is connected to the cathode 18 in the conventional manner. The potential of the cathode load resistor 32 is connected to the associated output circuit 11 through a suitable filter comprising the high frequency choke coil 38 and a by-pass condenser 39 connected to ground as indicated at 40.

From the above discussion it will be apparent that by virtue of the fact that electron discharge device 13 is of the gas type, such as a thyratron, the control electrode 19 loses control once that space discharge current flows, and thereafter the presence or absence of positive pulses supplied to the control electrode 19 through the coupling capacitor 25 cannot directly affect the ionized condition of the tube 13. It will be apparent that the positive pulses applied to the control electrode 19 through the coupling capacitor 25 overcome the negative bias voltage from the terminal 26 in order to cause firing of the tube 13.

In accordance with the present invention, the cathode load resistor 32 following firing of the tube 13 provides the source of plate potential for the electron discharge valves 15 and 16. To this end the cathode load resistor 32 has its cathode terminal connected to the plate 17 of the tube 16 through a suitable current limiting resistor 43 and to the plate 17 of the electron discharge valve 15 through a timing resistor 44. The plate 17 of the electron discharge valve 15 is also connected to a terminal 47 of a timing condenser 45 whose other terminal is connected to ground as indicated at 46. The cathode 18 of the electron discharge valve 16 is connected to ground designated as 48 through a cathode load resistor 49. The cathode 18 of the electron discharge valve 16 is also connected to the cathode terminal of the cathode load resistor 32 through a suitable condenser 50. The control electrode 19 of the electron discharge valve 16 is connected directly to the terminal 47 of the timing condenser 45. The screen grid 20 of the electron discharge valve 16, on the other hand, is connected directly to the cathode 18. A suitable by-pass condenser 52 connects the plate 17 to ground as indicated at 53.

The timing tube 15, on the other hand, has its cathode connected to a terminal 54 interposed between voltage dividing resistors 55 and 56 which are serially connected between the negative terminal of a source of potential 57 and ground generally designated at 58. A suitable by-pass condenser 60 connects the screen grid 20 and terminal 54 to ground 58.

In order to fire the tube 15 in response to the receipt of input pulses from the input circuit 14, the control electrode 19 of valve 15 is also connected to the input signal source 14 through a suitable coupling capacitor 61. A suitable negative biasing potential illustrated as obtained from the source 57 is also applied to the control electrode 19 of valve 15 through a suitable current limiting resistor 62.

Considering now briefly the operation of the switching circuit 10, it has been pointed out above that the switching tube 13 is fired under the influence of the pulses supplied from the pulse input circuit 14. When space current flow through this tube is established an operating anode potential of approximately 140 volts appears at the cathode end of the resistor 32. After this tube is fired, deionization thereof is under the control of the two associated tubes 15 and 16. More specifically, the extinguishing tube 16 is provided to deionize the tube 13 when the pulse signals from the source 14 are terminated while the tube 15 is provided to prevent undesired deionization of the tube 13 during brief discontinuities in the pulse signal input which in a telephone system, for example, would occur during hook switch flashing intervals and the like.

The manner in which the above mentioned functions are carried out in the circuit 10 may best be explained by reference to Figs. 2, 3 and 4 of the drawings, the significance of which is pointed out more fully below. Normally, i. e., with the circuit 10 inactive, the condenser 45 is completely discharged through the resistors 44 and 32 so that the terminal 47 thereof is at substantially zero potential. Also, with the circuit 10 inactive, the negative 100 volts impressed between the bias terminal 57 and ground by the bias potential source is divided between the two resistors 55 and 56 in the ratio of five volts across the resistor 55 and 95 volts across the resistor 56. Thus, the cathode of the tube 15 is normally maintained at a potential which is 95 volts negative with respect to ground. Due to the presence of this high negative potential upon the cathode of the tube 15, it is necessary to provide a separate heater supply source for the filamentary heater of the tube as described above in order to prevent arcing between the tube heater 22 and cathode 18 which would result in destruction of the tube heater 22. This is accomplished by providing the separate current supply transformer 24 having its primary winding connected to an appropriate source 23 of alternating current and its secondary winding bridged by the heater 22 of the tube 15. This winding is connected to the negative terminal of the 100 volt bias potential source so that the heater is effectively maintained at a potential approximately five volts negative with respect to the tube cathode. This arrangement positively precludes any arcing between the cathode and cathode heater of the tube 15.

When the switching tube 13 fires in the manner explained above, the condenser 52 is charged to the full value of the voltage across the resistor 32 through the resistor 43 and operating anode potential is supplied to the tube 16. Also, the condenser 50 is charged through the cathode resistor 49 to the full value of the voltage across the resistor 32. Charging of the condenser 50 over this path drives the cathode terminal of the resistor 49 highly positive during the initial portion of the charging interval. Concurrently with charging of the condenser 50 a charging path for the condenser 45 is established from the cathode terminal of the resistor 32 through the timing resistor 44. Initially, the major portion of the charging voltage appears across the resistor 44 and a very small portion thereof appears across the condenser 45. Similarly, the major portion of the charging voltage for the condenser 50 initially appears across the cathode resistor 49 immediately after the tube 13 fires. Thus, during the initial portion of the condenser charging interval, the control grid 19 of the tube 16 is held at ground potential whereas the cathode 18 of the tube 16 is driven highly positive. The grid 19 of the tube 16 is thus effectively biased negative relative to the tube cathode 18 by an amount equal to the voltage drop across the resistor 49. This bias prevents the tube 16 from firing.

As explained above, normally the grid of the tube 15 is biased approximately five volts negative relative to the tube cathode by the voltage across the resistor 55. This bias voltage prevents the tube 15 from firing in the absence of positive pulses supplied through the coupling capacitor 61 from the pulse input circuit 14. However, immediately positive pulses are gated through this capacitor 61, they are impressed upon the control grid 19 of the tube 15 and serve to drive this control grid positive relative to the tube cathode and fire the tube. It will thus be apparent that the tubes 15 and 13 are fired substantially simultaneously. When the tube 15 is fired, current flows through this tube and the condenser 45 in a circuit which extends from the grounded terminal of the resistor 56 through the condenser 45, the space current path through the tube 15 and the resistor 56. Thus, the voltage across the resistor 56 less the voltage drop through the tube 15 is impressed across the condenser 45 immediately the tube 15 fires. As a consequence, the capacitor terminal 47 is driven approximately 80 volts negative with respect to ground. In Fig. 4 of the drawings, this negative voltage rise of the terminal 47 is indicated along the portion $C_1$ of the potential curve A of the terminal 47. The negative potential thus developed at the terminal 47 is directly impressed upon the control grid of the tube 16 to bias this grid highly negative with respect to the cathode of the tube and thus prevent the tube from firing regardless of the voltage across the cathode resistor 49. When the voltage across the condenser 45 reaches a value of minus 80 volts, current flow through the tube 15 drops to the extinction point and is interrupted. The condenser 45 now starts to charge through the resistor 44 tending to approach the positive potential of 140 volts across the resistor 32 indicated by the line E in Fig. 4 of the drawings. The charging rate of the condenser 45 is obviously determined by the time constant of the series circuit comprising this condenser and the resistor 44. In this regard, it is pointed out that the condenser 45 preferably has a very large capacitance value, of the order of 0.1 microfarad, and the resistor 44 preferably has a very large resistance value of the order of 4.7 megohms, such that the time constant of the circuit is very long and the charging rate of the condenser 45 is correspondingly low. Specifically, the condenser 45 starts to charge at the rate indicated by the curve $A_1$ in Fig. 4. As it charges, the negative potential of the terminal 47 is correspondingly reduced as indicated by the segment $B_1$ of the curve A of Fig. 4. When the negative potential of this terminal 47 is reduced to a value of approximately 60 volts negative, the voltage across the tube 15 is increased to a value at which this tube refires. When the tube 15 refires, the voltage across the condenser 45 instantly rises in a negative direction to a value of 80 volts negative as indicated by the curve segment $C_2$ in Fig. 4 to again produce deionization of the tube 15. The described relaxation type of operation of the tube 15 and condenser 47 continues in the manner indicated by the curve segments $B_2$, $C_3$, $B_3$, $C_4$ so long as signal pulses continue to be received through coupling capacitor 61 from signal source 14.

In automatic telephone apparatus of the type disclosed in the above mentioned copending Morris and Trousdale application, the production of input signal pulses is arrested during the return stroke of the telephone dial and also when the hook is actuated as during hook flashing intervals. Also in other systems it is common to have lapses in the pulse signal source. Such a lapse in the pulse signal from source 14 is indicated between times $t_2$ and $t_3$ of Fig. 2 of the drawings. During this interval the tube 15 cannot refire after it is first extinguished during the initial portion of the pulse lapse period. Accordingly, and again referring to Fig. 4, the condenser 45 charges through the resistor 44 for the duration of the impulse in the manner indicated by the curve segment $B_4$. Due to the long time constant of the condenser charging circuit, the indicated pulse lapse period is not long enough to charge the condenser to the value D at which the negative bias on the control grid 19 of the tube 16 becomes insufficient to prevent this tube from firing. When the pulse lapse period from $t_2$ to $t_3$ ends and input pulses again occur as at time $t_3$ in Fig. 2, the tube 15 immediately fires to recharge the condenser 45 and raise the potential of the terminal 47 in a negative direction to the negative 80 volt value as indicated by the curve segment $C_5$. During the succeeding period following time $t_3$ in Fig. 2 of the drawings when the pulses again occur, the described relaxation operation of the tube 15 and condenser 45 is resumed in the manner explained above as indicated by the curve segments $B_5$, $C_6$, $B_6$ and $C_7$ of the curve A of Fig. 4. In the event that the present invention is applied to a telephone system of the type referred to above, the input pulse signals would continue so long as the receiver at the calling station is off hook, and during this time the described relaxation operation will also continue. In Fig. 4 the curve segments $B_7$ and $C_8$ of the curve A illustrate the last relaxation cycle which occurs before the pulses are terminated at time $t_4$ as, for example, in an automatic telephone system when the call is abandoned or terminated.

Figures 2, 3, 4:
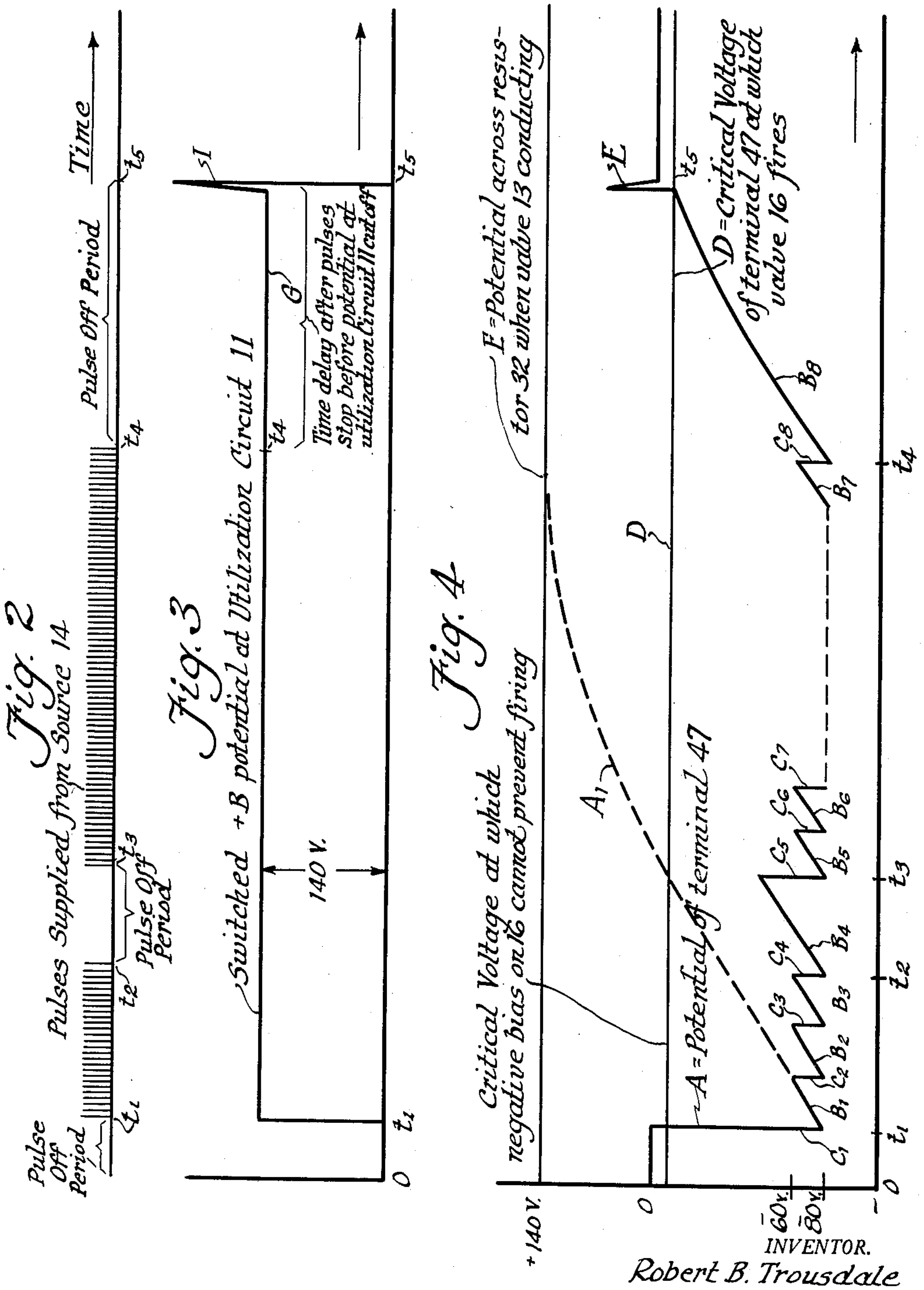
Figs. 2, 3 and 4 are curve diagrams to aid in understanding the operation of the embodiment shown in Fig. 1.

When the input circuit ceases to produce pulses applied to the control electrodes 19 of electron discharge valves 13 and 15, the condenser 45 is permitted to charge through the resistor 44 from the cathode resistor 32 so that the negative potential of the terminal 47 is decreased along the curve segment $B_8$ of Fig. 4. When this potential reaches the critical value D with a corresponding reduction of the bias on the control grid of the tube 16, this tube fires. In firing, the tube 16 instantly discharges the condenser 52 through the space current path thereof and the resistor 49. Thus, a voltage of approximately 130 volts is developed across the resistor 49. This voltage spike is additively combined with the 140 volts across the charged condenser 50 to produce a voltage across the cathode resistor 32 of approximately 270 volts. Thus, at time $t_5$ the cathode of the tube 13 is driven positive relative to the anode of this tube and space current flow through the tube is interrupted. Referring to Figs. 3 and 4, the transient spike occurring at time $t_5$ and developed across the resistor 32 is indicated at I at the end of the switched +B potential curve G in Fig. 3 and the change in potential at the terminal point 47 produced by the same transient voltage is indicated at E along the potential curve A of Fig. 4. When space current flow in the tube 13 is thus interrupted, the condenser 50 discharges through the two resistors 32 and 49, following which the voltage across the resistor 32 drops to zero. Thus, operating anode potentials are removed from the utilization circuit 11.

From the preceding explanation, it will be understood that the switching circuit of Fig. 1 functions positively to prevent false cut off of the potential to circuit 11 during momentary pulse lapses of the signal source 14.

Figure 5:
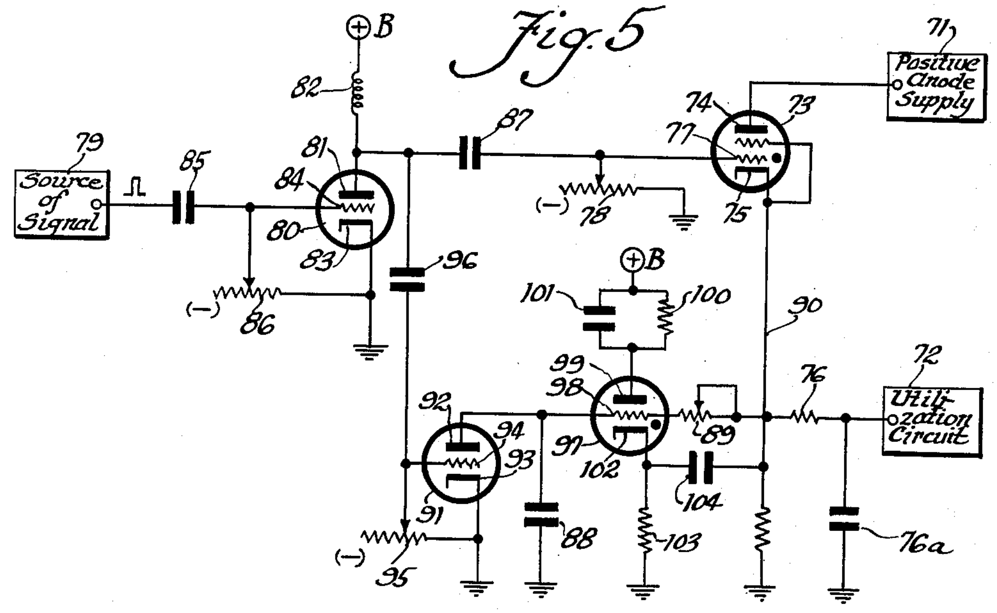
Fig. 5 is a schematic diagram illustrating another embodiment of the present invention.

Referring now to the modification of Fig. 5 of the drawings, there is shown an electronic switching circuit intended to be utilized to furnish the anode supply for a suitable utilization circuit and this electronic switching circuit employs both high vacuum and gas type electron discharge valves. The anode supply is indicated by the numeral 71 and the utilization circuit is illustrated by the numeral 72. In order to switch the anode supply with respect to the electron discharge devices in the utilization circuit 72, there is provided an electrical switch 73 in series with the anode supply 71 and the utilization circuit 72. The electrical switch preferably comprises an electron discharge device 73 of the gas containing type which will continue to conduct, once it is triggered on, until the cathode-to-anode potential is made insufficient to continue the current flow through the tube. A device of this type is desirable because such devices as was mentioned above had a relatively low and constant internal voltage drop.

Anode 74 of device 73 is illustrated as being connected directly to the anode supply 71, and the cathode 75 is illustrated as being connected to the utilization circuit 72 through a suitable filter comprising resistor 76 and capacitor 76*a*. The control electrode 77 of device 73 is suitably biased beyond cutoff as by means of a suitable source of negative potential. There is illustrated a resistor 78 connected between a suitable source of negative potential and ground, and the control electrode 77 is connected to a suitable point on that resistor.

For the purpose of triggering the discharge device 73 there is provided a signal source 79 which preferably is a source of a train of pulses or the like. Between the source 79 and the switch 73, there is interposed a control element which may be an electron discharge device 80 illustrated as being of the triode type. The anode 81 of discharge device 80 is connected to a suitable source of +B potential through a suitable inductance 82. Cathode 83 of device 80 is connected to ground, and signals from source 79 are applied to control electrode 84 of device 80 through a suitable coupling capacitor 85. The discharge device 84 is normally biased beyond cutoff by connecting the control electrode 84 to a suitable source of negative biasing potential, as for example, to a point on potentiometer or resistor 86 connected between ground and a suitable negative potential.

The source of signal potential or control quantity 79 is arranged to deliver positive-going pulses to discharge device 80 of sufficient amplitude to render conductive device 80. The presence of inductance 82 in the anode circuit causes a transient to be set up in the output circuit of device 80 which, in effect, prolongs the duration of the signal pulses and strengthens the effect of the signal pulses. The transients are applied to the control electrode 77 of device 73 through a suitable coupling capacitor 87. The appearance of a sufficiently positive potential on control electrode 77 causes the device 73 to become conductive to connect the anode supply 71 to the utilization circuit 72. With the type of device employed, the control electrode 77 loses control and device 73 continues to conduct until its anode-to-cathode potential is brought below the current-sustaining level.

Means are provided for disconnecting the anode supply at the end of the period when source 79 produces a pulse signal. For this purpose, there is provided a series combination of resistor 89 and capacitor 88, resistor 89 being illustrated as connected to cathode 75 of discharge device 73 while capacitor 88 is illustrated being connected between resistor 89 and ground. With the arrangement described, the switched potential tends to charge capacitor 88 through resistor 89.

Means are provided for limiting the charge attained by capacitor 88 during the time when it is desired to connect the anode potential source 71 to the utilization circuit 72. In Fig. 5 there is illustrated for this purpose an electron discharge device 91 shown as being of the triode type having an anode 92 connected to the ungrounded side of capacitor 88 and, therefore, to the anode potential lead or conductor 90 through series resistor 89. The cathode 93 is grounded and the control electrode 94 of device 91 is connected to a suitable source of bias potential. In Fig. 5 control electrode or grid 94 is connected to a point on a suitable resistor 95 which in turn is connected between ground and a suitable source of negative potential.

With the arrangement shown, and in the absence of signal pulses from the source 79, discharge device 91 is nonconductive. The transients appearing in the output of device 80 are applied to control electrode 94 through a suitable coupling capacitor 96 and by choosing properly the value of cutoff bias, device 91 is rendered conductive upon the appearance of signal energy, thereby shunting capacitor 88. With a pulse input, device 91 becomes non-conductive between pulses and capacitor 88 begins to charge, but the next pulse again discharges the capacitor. However, upon the cessation of signal energy for a predetermined time, discharge device 91 remains non-conductive and the shunt across capacitor 88 is removed for a time sufficient to allow the capacitor 88 to charge uninterruptedly through resistor 89 toward the potential of conductor 90. The rate of charge depends upon the time constant of the resistance-capacity circuit comprising resistor 89 and capacitor 88. In order to adjust the time of charging, resistor 89 may be made variable as illustrated.

Means are provided for utilizing the charge on capacitor 88 to extinguish the discharge through the device 73 and, therefore, to open the electrical switch. This means includes a discharge device 97, preferably of the gas-filled type, and which may be a cold cathode device. The control electrode 98 of device 97 is connected to the ungrounded side of capacitor 88. The anode 99 of device 97 is connected to a suitable source of positive potential through a resistor 100 shunted by a capacitor 101. Cathode 102 of device 97 is connected to ground through a suitable resistor 103. Any potential established across resistor 103 is applied to the cathode 75 of discharge device 73 through a suitable coupling capacitor 104.

When the potential across capacitor 88 reaches a sufficiently high value, discharge device 97 is rendered conductive and, momentarily, substantially the entire resistive drop in the anode-to-cathode circuit exclusive of tube drop appears across resistor 103. Capacitor 104 was previously charged to the potential of anode supply lead 90. The sum of the potentials across resistor 103 and capacitor 104 is applied to cathode 75 of discharge device 73 and the sum being in excess of the internal drop of discharge device 73, the potential at cathode 75 is raised sufficiently to render discharge device 73 non-conductive.

The presence of capacitor 101 results in a gradual shift of potential from across resistor 103 to capacitor 101 and eventually the difference in potential between anode 99 and cathode 102 becomes too small to continue conduction and discharge device 97 becomes non-conducting. At this point the system is reset for the next conductive period.

Figure 6:
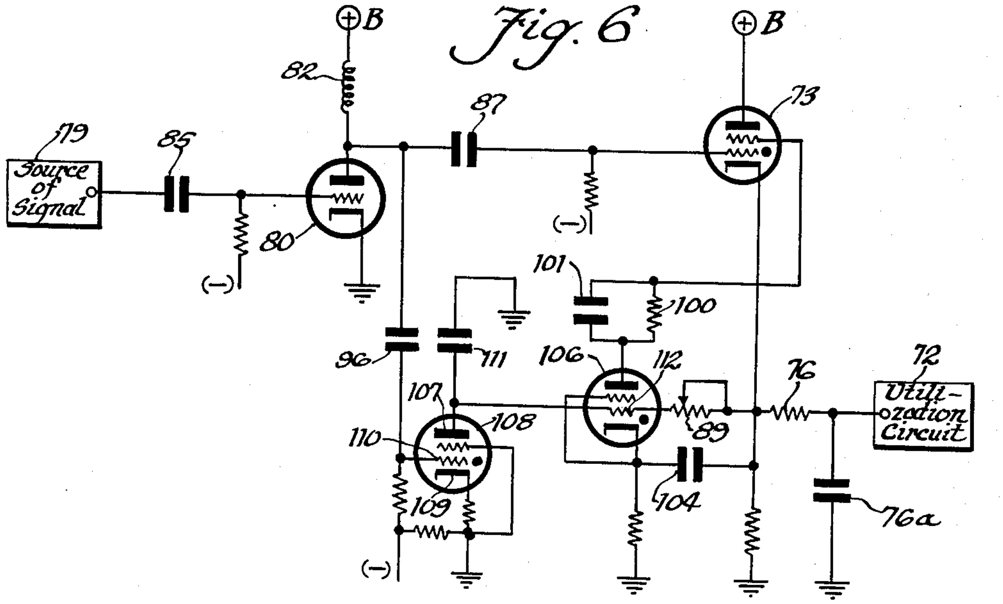
Fig. 6 illustrates a modification of Fig. 5.

In Fig. 6 there is illustrated a modification of the present invention in which electron discharge device 91 is replaced by an electron discharge device 108 of the gaseous discharge type. Gas discharge device 106 is substituted for the cold cathode tube 97 and serves as a switching tube which, when ignited, momentarily supplies anode current from capacitor 101. Discharge device 106 is biased beyond cutoff while the circuit is in use by means of potential supplied from anode 107 of gaseous discharge device 108 by means of the negative potential at cathode 109 of discharge device 108. Discharge device 108 is repeatedly triggered by the input pulses amplified by discharge device 80 and the "ringing" coil 82 and applied to the control electrode 110 of discharge device 108 through coupling capacitor 96.

As indicated, discharge device 108 is a gaseous discharge tube and the circuit constants are arranged to provide relaxation oscillator operation. The tube 108, however, is arranged so that it is not completely self-oscillating but requires triggering by the incoming signal pulses. Therefore, as long as signal pulses persist, discharge device 108 oscillates and capacitor 111 connected between anode 107 and ground is charged in a negative direction to maintain discharge device 106 cutoff. When signal pulses cease, discharge device 108 no longer oscillates and the potential at control electrode 112 of discharge device 106 gradually becomes more and more positive until finally discharge device 106 is rendered conductive to extinguish conduction through discharge device 73 which removes the potential supplied to utilization circuit 72 and disables the associated discharge device circuits.

By employing a gaseous discharge device 108, the circuit functions completely once the circuit is triggered by an incoming signal pulse even though the triggering pulses may be extremely short. Therefore, the modification shown in Fig. 6 is less affected by variations in signal pulses. A gaseous type discharge device 106 has been used instead of the cold cathode tube 97 illustrated in Fig. 5, because of its more reliable operation and higher peak current.

While there have been illustrated and described several embodiments of the present invention, it will be obvious to those skilled in the art that various changes and modifications may be made therein without departing from the invention, and it is, therefore, aimed in the appended claims to cover all such changes and modifications as fall within the true spirit and scope of the present invention.

What is claimed as new and desired to be secured by Letters Patent of the United States is:

1. In a communication system, a source of potential, utilization means, an electron discharge device having an anode a cathode and a control electrode, the anode-cathode path of said discharge device interconnecting said potential source with said utilization means, a signal source connected to said control electrode, said device being rendered conductive in response to the production of a signal at said signal source thereby to connect said source of potential to said utilization means, and means jointly responsive to the flow of current through said discharge device and the continued absence of a signal at said signal source for a predetermined time interval for establishing an electrical quantity for rendering said discharge device non-conductive.

2. In a communication system, a source of potential, utilization means, an electron discharge device having an anode a cathode and a control electrode, the anode-cathode path of said discharge device interconnecting said potential source with said utilization means, a signal source connected to said control electrode, said device being rendered conductive in response to the production of a signal at said signal source thereby to connect said source of potential to said utilization means, a capacitor, means responsive to the flow of current through said device for charging said capacitor in a predetermined manner and operative in the event of continued absence of signals at said signal source for a predetermined time interval to charge said capacitor to a predetermined charge, and means responsive to said predetermined charge on said capacitor for rendering said discharge device non-conductive.

3. In a communication system, a source of potential, utilization means, an electron discharge device having an anode a cathode and a control electrode, the anode-cathode path of said discharge device interconnecting said source with said utilization means, a signal source connected to said control electrode, said discharge valve being rendered conductive in response to the production of a signal at said signal source thereby to connect said source of potential to said utilization means, means responsive to the flow of current through said discharge device and the absence of a signal at said signal source for establishing an electrical quantity for rendering said discharge device non-conductive, and means for varying the delay period between the time no signal appears at said signal source and the rendering non-conductive of said discharge device.

4. In a communication system, a source of potential, utilization means, an electrical switch comprising an electron discharge device interconnecting said source and said utilization means, a control electrode for said device, a control signal source connected to said control electrode, means responsive to the appearance of signal energy from said signal source on said control electrode for causing conduction through said electron discharge device and the application of potential to said utilization means, a capacitor, means responsive to the flow of current through said electron discharge device for charging said capacitor in a predetermined manner, means responsive to the production of signal energy by said signal source for limiting the extent to which said capacitor is charged in said predetermined manner, the absence of signal energy from said signal source permitting said capacitor to charge uninterruptedly in said predetermined manner, and means responsive to the charge developed across said capacitor when charged uninterruptedly in said predetermined manner for a predetermined time for extinguishing the flow of current through said discharge device.

5. In a communication system, a source of potential, utilization means, an electrical switch comprising an electron discharge device interconnecting said source and said utilization means, a control electrode for said device, a control signal source connected to said control electrode, means responsive to the appearance of signal energy from said signal source on said control electrode for causing conduction through said electron discharge device and the application of potential to said utilization means, a capacitor, means responsive to the flow of current through said electron discharge device for charging said capacitor in a predetermined manner, means comprising a second electron discharge device responsive to the production of signal energy by said signal source for limiting the extent to which said capacitor is charged in said predetermined manner, the absence of signal energy from said signal source permitting said capacitor to charge uninterruptedly in said predetermined manner, and means responsive to the charge developed across said capacitor when charged uninterruptedly in said predetermined manner for a predetermined time for extinguishing the flow of current through said discharge device.

6. In a communication system, a source of potential, utilization means, an electrical switch comprising an electron discharge device interconnecting said source and said utilization means, a control electrode for said device, a control signal source connected to said control electrode, means responsive to the appearance of signal energy from said signal source on said control electrode for causing conduction through said electron discharge device and the application of potential to said utilization means, a capacitor, means responsive to the flow of current through said electron discharge device for charging said capacitor in a predetermined manner, means comprising a second electron discharge device responsive to the production of signal energy by said signal source for limiting the extent to which said capacitor is charged in said predetermined manner, the absence of signal energy from said signal source permitting said capacitor to charge uninterruptedly in said predetermined manner, and means comprising a third electron discharge device responsive to the charge developed across said capacitor when charged uninterruptedly in said predetermined manner for a predetermined time for extinguishing the flow of current through said discharge device.

7. In combination, a potential supply circuit, a utilization circuit, an electronic switch comprising a first electron discharge valve for connecting said supply circuit to said utilization circuit, said valve having a control electrode, a signal source connected to said control electrode, the receipt of a predetermined signal from said signal source rendering said electronic switch effective to interconnect said supply and utilization circuits, a second electron discharge valve having a control electrode, means for connecting the control electrode of said second valve to said signal source thereby to render said second valve conductive substantially simultaneously with said first valve, circuit means responsive to the flow of current through said second valve for rendering said second valve non-conductive, means responsive to the flow of current through said first valve while said second valve is non-conductive for rendering said last mentioned means ineffective whereupon said second valve is again rendered conductive following receipt of a predetermined signal from said signal source, a third electron discharge valve, and means for rendering said third electron discharge valve conductive only after said second discharge valve remains non-conductive for a predetermined time following conduction thereof, and means for connecting said third valve in circuit with said first valve to render said first valve non-conductive upon firing of said third valve.

8. In combination, a potential supply circuit, a utilization circuit, an electronic switch comprising a first electron discharge valve containing an ionizable medium for connecting said supply circuit to said utilization circuit, said valve having a control electrode, a signal source connected to said control electrode, the receipt of a predetermined signal from said signal source rendering said electronic switch effective to interconnect said supply and utilization circuits, a second electron discharge valve containing an ionizable medium having a control electrode, means for connecting the control electrode of said second valve to said signal source thereby to render said second valve conductive substantially simultaneously with said first valve, circuit means responsive to the flow of current through said second valve for rendering said second valve non-conductive, means responsive to the flow of current through said first valve while said second valve is non-conductive for rendering said last mentioned means ineffective whereupon said second valve is again rendered conductive following receipt of a predetermined signal from said signal source, a third electron discharge valve containing an ionizable medium, and means for rendering said third electron discharge valve conductive only after said second discharge valve remains non-conductive for a predetermined time following conduction thereof, and means for connecting said third valve in circuit with said first valve to render said first valve non-conductive upon firing of said third valve.

9. In combination, a potential supply circuit, a utilization circuit, an electronic switch comprising a first electron discharge valve for connecting said supply circuit to said utilization circuit, said valve having a control electrode, a signal source connected to said control electrode, the receipt of a predetermined signal from said signal source rendering said electronic switch effective to interconnect said supply and utilization circuits, a second electron discharge valve having a control electrode, means for connecting the control electrode of said second valve to said signal source thereby to render said second valve conductive substantially simultaneously with said first valve, circuit means responsive to the flow of current through said second valve for rendering said second valve non-conductive, means responsive to the flow of current through said first valve while said second valve is non-conductive for rendering said last mentioned means ineffective whereupon said second valve is again rendered conductive following receipt of a predetermined signal from said signal source, and means for rendering said first valve non-conductive.

10. In combination, a potential supply circuit, a utilization circuit, an electronic switch comprising a first electron discharge valve for connecting said supply circuit to said utilization circuit, said valve having a control electrode, a signal source connected to said control electrode, the receipt of a predetermined signal from said signal source rendering said electronic switch effective to interconnect said supply and utilization circuits, a second electron discharge valve having a control electrode, means for connecting the plate circuit of said second valve in series with said first valve means for connecting the control electrode of said second valve to said signal source thereby to render said second valve conductive substantially simultaneously with said first valve, circuit means responsive to the flow of current through said second valve for rendering said second valve non-conductive, means responsive to the flow of current through said first valve while said second valve is non-conductive for rendering said last mentioned means ineffective whereupon said second valve is again rendered conductive following receipt of a predetermined signal from said signal source, a third electron discharge valve, and means for rendering said third electron discharge valve conductive only after said second discharge valve remains non-conductive for a predetermined time following conduction thereof, and means for connecting said third valve in circuit with said first valve to render said first valve non-conductive upon firing of said third valve.

11. In combination, a potential supply circuit, a utilization circuit, an electronic switch comprising a first electron discharge valve for connecting said supply circuit to said utilization circuit, said valve having a control electrode, a signal source connected to said control electrode, the receipt of a predetermined signal from said signal source rendering said electronic switch effective to interconnect said supply and utilization circuits, a second electron discharge valve having a control electrode, means for connecting the control electrode of said second valve to said signal source thereby to render said second valve conductive substantially simultaneously with said first valve, circuit means responsive to the flow of current through said second valve for rendering said second valve non-conductive, means responsive to the flow of current through said first valve while said second valve is non-conductive for rendering said last mentioned means ineffective whereupon said second valve is again rendered conductive following receipt of a predetermined signal from said signal source, a third electron discharge valve having its plate circuit connected in series with said first valve, and means for rendering said third electron discharge valve conductive only after said second discharge valve remains non-conductive for a predetermined time following conduction thereof, and means for connecting said third valve in circuit with said first valve to render said first valve non-conductive upon firing of said third valve.

12. In combination, a potential supply circuit, a utilization circuit, an electronic switch comprising a first electron discharge valve for connecting said supply circuit to said utilization circuit, said valve having a control electrode, a signal source connected to said control electrode, the receipt of a predetermined signal from said signal source rendering said electronic switch effective to interconnect said supply and utilization circuits, a second electron discharge valve having a control electrode, means for connecting the plate of said second valve to the cathode of said first valve, means for connecting the control electrode of said second valve to said signal source thereby to render said second valve conductive substantially simultaneously with said first valve, means comprising a capacitor connected to the plate of said second valve and adapted to be charged in a predetermined manner in response to current flow through said second valve to render said second valve non-conductive, means for charging said capacitor in a different predetermined manner while said second valve is non-conductive to permit said second valve to be rendered conductive in response to the receipt of a signal from said signal source, a third electron discharge valve, and means for rendering said third electron discharge valve conductive only after said second discharge valve remains non-conductive for a predetermined time following conduction thereof, and means for connecting said third valve in circuit with said first valve to render said first valve non-conductive upon firing of said third valve.

13. In combination, a potential supply circuit, a utilization circuit, an electronic switch comprising a first electron discharge valve for connecting said supply circuit to said utilization circuit, said valve having a control electrode, a signal source connected to said control electrode, the receipt of a predetermined signal from said signal source rendering said electronic switch effective to interconnect said supply and utilization circuits, a second electron discharge valve having a control electrode, means for connecting the plate of said second valve to the cathode of said first valve, means for connecting the control electrode of said second valve to said signal source thereby to render said second valve conductive substantially simultaneously with said first valve, means comprising a capacitor connected to the plate of said second valve and adapted to be charged in a predetermined manner in response to current flow through said second valve to render said second valve non-conductive, means for charging said capacitor in a different predetermined manner while said second valve is non-conductive to permit said second valve to be rendered conductive in response to the receipt of a signal from said signal source, and a third electron discharge valve for extinguishing the current flow through said first valve.

14. In combination, a potential supply circuit, a utilization circuit, an electronic switch comprising a first electron discharge valve for connecting said supply circuit to said utilization circuit, said valve having a control electrode, a signal source connected to said control electrode, the receipt of a predetermined signal from said signal source rendering said electronic switch effective to interconnect said supply and utilization circuits, a second electron discharge valve having a control electrode, means for connecting the plate of said second valve to the cathode of said first valve, means for connecting the control electrode of said second valve to said signal source thereby to render said second valve conductive substantially simultaneously with said first valve, means comprising a capacitor connected to the plate of said second valve and adapted to be charged in a predetermined manner in response to current flow through said second valve to render said second valve non-conductive, and means for charging said capacitor in a different predetermined manner while said second valve is non-conductive to permit said second valve to be rendered conductive in response to the receipt of a signal from said signal source.

15. In combination, a source of potential, utilization means, a normally non-conductive gaseous discharge device for connecting said source to said utilization means, a source of pulses, means responsive to the receipt of pulses from said source of pulses for producing an oscillatory transient corresponding to each pulse and of substantially greater duration than said pulse, and means responsive to the production of said oscillatory transients for rendering conductive said gaseous discharge device to connect said source of potential to said utilization circuit.

16. In combination, a source of potential, utilization means, a normally non-conductive gaseous discharge device for connecting said source to said utilization means, a source of pulses, means responsive to the receipt of pulses from said source of pulses for producing transient waves, means responsive to the occurrence of said transient waves for rendering conductive said gaseous discharge device to connect said source of potential to said utilization circuit, means responsive to the cessation of the production of said transient waves for a predetermined time for again rendering non-conductive said gaseous discharge device, said last-mentioned means comprising a capacitor, means responsive to the potential supplied to said utilization means for charging said capacitor, an electron discharge valve connected in shunt with said capacitor, additional means responsive to the occurrence of said transient waves for causing firing of said electron discharge valve to prevent the accumulation of a charge on said capacitor, said capacitor being permitted to charge following the cessation of the production of transient waves, and means responsive to a predetermined charge on said capacitor for rendering non-conductive said gaseous discharge device.

17. In combination, a source of potential, utilization means, a normally non-conductive gaseous discharge device for connecting said source to said utilization means, a source of pulses, means responsive to the receipt of pulses from said source of pulses for rendering conductive said gaseous discharge device to connect said source of potential to said utilization circuit, means responsive to the cessation of the production of said pulses for a predetermined time for again rendering non-conductive said gaseous discharge device, said last-mentioned means comprising a capacitor, means responsive to the potential supplied to said utilization means for charging said capacitor, an electron discharge valve connected in shunt with said capacitor, additional means responsive to the occurrence of said pulses for causing firing of said electron discharge valve to prevent the accumulation of a charge on said capacitor, said capacitor being permitted to charge following the cessation of the production of said pulses, and means responsive to a predetermined charge on said capacitor for rendering non-conductive said gaseous discharge device.

18. In combination, a potential supply circuit, a utilization circuit, an electron discharge device, means connecting said potential supply circuit, the anode-cathode space path of said device and said utilization circuit in series circuit relation, a signal source, means responsive to signals developed by said signal source for rendering said device conductive, thereby to connect said potential supply circuit to said utilization circuit through said conducting device, means responsive to the flow of current through said device for establishing an electrical quantity a predetermined interval after said device is rendered conductive, means responsive to the continued flow of signals from said signal source for preventing said electrical quantity from being established, and means responsive to the establishment of said electrical quantity in the absence of signals from said signal source for rendering said device non-conductive, thereby to disconnect said utilization circuit from said potential supply circuit.

19. In combination, a potential supply circuit, a utilization circuit, an electron discharge device, means connecting said potential supply circuit, the anode-cathode space path of said device and said utilization circuit in series circuit relation, a signal source, means responsive to signals developed by said signal source for rendering said device conductive, thereby to connect said potential supply circuit to said utilization circuit through said conducting device, means responsive to the flow of current through said device and operative in the absence of signals from said source for a predetermined time interval for establishing an electrical quantity, said last-named means including means responsive to the continued flow of signals from said signal source for preventing said electrical quantity from being established, and means responsive to the establishment of said electrical quantity in the absence of signals from said signal source for rendering said device non-conductive, thereby to disconnect said utilization circuit from said potential supply circuit.

20. In combination, a potential supply circuit, a utilization circuit, an electron discharge device, means connecting said potential supply circuit, the anode-cathode space path of said device and said utilization circuit in series circuit relation, a signal source, means responsive to signals developed by said signal source for rendering said device conductive, thereby to connect said potential supply circuit to said utilization circuit through said conducting device, a capacitor, means responsive to the flow of current through said device for charging said capacitor, means for preventing said last-named means from charging said capacitor to a predetermined voltage level during the continued flow of signals from said signal source while permitting said capacitor to be charged to said voltage level in the absence of signals from said signal source, and means responsive to charging of said capacitor to said voltage level for rendering said device non-conductive, thereby to disconnect said utilization circuit from said potential supply circuit.

21. In combination, a potential supply circuit, a utilization circuit, an electron discharge device, having an anode, a cathode and a control grid, means connecting the anode-cathode path of said device, said potential supply circuit and said utilization circuit in series circuit relation, a signal source, means for rendering said device conductive in response to signals developed by said signal source, thereby to connect said supply circuit to said utilization circuit through said conducting discharge device, and means jointly responsive to the conduction of said discharge device and the continued absence of a signal at said signal source for a predetermined time interval for increasing the cathode potential of said discharge device by an amount sufficient to render said device non-conductive, thereby to disconnect said supply circuit from said utilization circuit.

22. In combination, a potential supply circuit, a utilization circuit, an electron discharge device having an anode, a cathode and a control grid, means connecting the anode-cathode path of said device, said potential supply circuit and said utilization circuit in series circuit relation, a signal source, means for rendering said device conductive in response to signals developed by said signal source, thereby to connect said supply circuit to said utilization circuit through said conducting discharge device, a capacitor, means responsive to the flow of current through said discharge device for charging said capacitor in a given direction and at a predetermined rate, means responsive to signals developed by said signal source for preventing said capacitor from being charged to a predetermined level by said capacitor charging means, said capacitor charging means being capable of charging said capacitor to said predetermined level in the absence of signals from said signal source, and means responsive to charging of said capacitor to said predetermined level for increasing the cathode potential of said discharge device by an amount sufficient to render said device non-conductive, thereby to disconnect said supply circuit from said utilization circuit.

23. In combination, a potential supply circuit, a utilization circuit, an electron discharge device having an anode, a cathode and a control grid, means connecting the anode-cathode path of said device, said potential supply circuit and said utilization circuit in series circuit relation, a source of pulses, means normally biasing said device against conduction, means responsive to pulses developed by said pulse source for rendering said device conductive, thereby to connect said supply circuit to said utilization circuit, a capacitor, means responsive to the flow of current through said device for charging said capacitor in a given direction, means for discharging said capacitor to a predetermined lower level in response to pulses developed by said pulse source, and means responsive to charging of said capacitor to a predetermined upper level for increasing the cathode potential of said device by an amount sufficient to render said device non-conductive, thereby to disconnect said supply circuit from said utilization circuit.

24. In combination, a potential supply circuit, a utilization circuit, a first electron discharge device having an anode, a cathode and a control grid, means connecting the anode-cathode path of said first device, said potential supply circuit and said utilization circuit in series circuit relation, a signal source, means for rendering said first device conductive in response to signals developed by said signal source, thereby to connect said supply circuit to said utilization circuit through said conducting first discharge device, a second discharge device, means for supplying anode potential to said second device concurrently with energization of said utilization circuit, means for preventing said second device from conducting upon application of anode potential thereto, a capacitor, means for charging said capacitor in a given direction in response to current flow through said first device, means responsive to signals developed by said signal source for charging said capacitor in the opposite direction, means responsive to charging of said capacitor to a predetermined level in said given direction for rendering said second device conductive, and means responsive to current flow through said second device for increasing the cathode potential of said first device by an amount sufficient to render said first device non-conductive, thereby to disconnect said supply circuit from said utilization circuit.

25. In combination, a potential supply circuit, a utilization circuit, first second and third gas tubes each having an anode a cathode and a control grid, means connecting said potential supply circuit, the anode-cathode path of said first tube and said utilization circuit in series circuit relation, a signal source, means normally biasing said first tube against conduction, means responsive to signals developed by said signal source for firing said first tube, thereby connecting said potential supply circuit to said utilization circuit, means responsive to the application of potential to said utilization circuit for supplying anode potential to said second gas tube, means for preventing said second tube from firing upon the application of anode potential thereto, a capacitor connected to the anode of said third tube, means connecting the cathode of said third tube to a negative bias potential, means including a timing resistor for charging said capacitor in a given direction upon application of potential to said utilization circuit, means responsive to signals developed by said signal source for firing said third tube and charging said capacitor in the opposite direction through said third tube, said third tube being extinguished when the potential across said capacitor approaches said negative bias potential, means responsive to charging of said capacitor in said given direction to a predetermined positive level in the absence of signals from said signal source for firing said second tube, and means responsive to current flow through said second tube for increasing the cathode potential of said first tube by an amount sufficient to extinguish said first tube, thereby to disconnect said utilization circuit from said potential supply circuit.

26. In combination, a potential supply circuit, a utilization circuit, a first electron discharge device, means connecting said first device, said potential supply circuit and said utilization circuit in series circuit relation, a signal source, means for rendering said first device conductive in response to signals developed by said signal source, thereby to connect said supply circuit to said utilization circuit through said conducting first discharge device, a capacitor and resistor connected in series across said utilization circuit, said capacitor being charged to the potential applied to said utilization circuit when said first device is rendered conductive, a second electron discharge device having at least an anode and a cathode, the cathode of said second device being connected to said resistor, means jointly responsive to the conduction of said first device and the absence of signals from said signal source for rendering said second device conductive to produce a potential across said resistor, and means for applying the sum of the potentials across said capacitor and resistor to the cathode of said first device thereby to render said first device non-conductive and disconnect said utilization circuit from said potential supply circuit.

27. In combination, a source of potential, utilization means, a normally non-conductive gaseous discharge device for connecting said source to said utilization means, a source of pulses of given polarity, an electron discharge device including an input electrode and an output electrode, a highly inductive load circuit connected to said output electrode, means for impressing pulses developed by said source upon said input electrode, means for deriving from said output electrode an oscillatory transient corresponding to each of said pulses, at least a portion of each oscillatory transient being of the same polarity as said pulses and of substantially greater duration than said pulses, and means responsive to said portions of said oscillatory transients for firing said gaseous discharge device to connect said source of potential to said utilization circuit.

ROBERT B. TROUSDALE.

References Cited in the file of this patent

UNITED STATES PATENTS

| Number | Name | Date |
|---|---|---|
| 2,409,583 | Perkins | Oct. 15, 1946 |
| 2,428,149 | Falk | Sept. 30, 1947 |
| 2,473,432 | Johnston | June 14, 1949 |
| 2,490,960 | Hanchett | Dec. 13, 1949 |
| 2,519,413 | Taylor | Aug. 22, 1950 |